(12) United States Patent
Lin

(10) Patent No.: US 8,408,161 B2
(45) Date of Patent: Apr. 2, 2013

(54) PET BRUSH WITH REPLACEABLE BRISTLE MEMBER

(75) Inventor: Ralph Lin, Taipei (TW)

(73) Assignee: Han Lien International Corp., Taipei (TW)

( * ) Notice: Subject to any disclaimer, the term of this patent is extended or adjusted under 35 U.S.C. 154(b) by 744 days.

(21) Appl. No.: 12/552,084

(22) Filed: Sep. 1, 2009

(65) Prior Publication Data

US 2011/0048336 A1     Mar. 3, 2011

(51) Int. Cl.
*A01K 13/00* (2006.01)
*A46B 7/04* (2006.01)

(52) U.S. Cl. .......... 119/625; 119/633; 15/145; 15/176.1

(58) Field of Classification Search .......... 119/614–616, 119/625, 633; 15/144.1, 145, 176.1–176.6
See application file for complete search history.

(56) References Cited

U.S. PATENT DOCUMENTS

| 2,803,256 | A  | * | 8/1957  | Lerner ............... 132/123 |
| 5,072,477 | A  | * | 12/1991 | Pai ................... 15/22.1 |
| 7,225,815 | B2 | * | 6/2007  | Kung ................. 132/119 |
| 2004/0035435 | A1 | * | 2/2004 | Glucksman et al. .... 132/114 |
| 2009/0235475 | A1 | * | 9/2009 | Bohannon et al. ...... 15/111 |

* cited by examiner

*Primary Examiner* — Kimberly Berona
(74) *Attorney, Agent, or Firm* — Tracy M. Heims; Apex Juris, pllc

(57) ABSTRACT

The present invention provides a pet brush including a handle, a hub, a ring, and a bristle member. The bristle member is detachably connected to the handle. The hub is provided at a connecting portion of the bristle member and the handle so that the ring may be rotated. The ring may be shifted between a first position and a second position. The bristle member is secured to the handle when the ring is moved to the first position, and the bristle member is free to be inserted into and drawn out of the handle when the ring is moved to the second position.

8 Claims, 11 Drawing Sheets

PET BRUSH WITH REPLACEABLE BRISTLE MEMBER

BACKGROUND OF THE INVENTION

1. Field of the Invention

The present invention relates generally to a cleaning device for pets, and more particularly, to a pet brush with replaceable bristle member.

2. Description of the Related Art

A conventional pet brush includes a handle and a bristle member at an end of the handle. The bristle member has a plurality of bristles for brushing pet's hair. However, there is a diversity of density, length, and thickness of animal's hair. Typically, an animal with long and dense hair needs a brush with longer and thicker bristles, and an animal with short and thin hair needs a brush with shorter and thinner bristles. When a person has more than one pet, he/she has to prepare different pet brushes for different animals. It is not economic to prepare different pet brushes, and furthermore, it can be a problem to store these pet brushes.

SUMMARY OF THE INVENTION

The primary objective of the present invention is to provide a pet brush, with which the bristle member can be replaced for different animals, and the bristle member and the handle has a firm connection.

According to the objective of the present invention, a pet brush includes a handle, a hub, a ring, and a bristle member. The handle has a first bore and at least a first slot on a sidewall of the first bore. The hub is fixed to the handle and unable to rotate. The hub has a second bore communicated with the first bore of the handle. The ring has at least a second slot on an inner side and at least a lock block with a face. The ring is received in the second bore of the hub to be moved between a first position, in which the lock block is aligned with the first slot of the handle, and a second position, in which the second slot is aligned with the first slot of the handle. The bristle member has a shaft with at least a guiding block. When the shaft of the bristle member is inserted into the first bore of the handle and the guiding block is engaged with the first slot, the bristle member is secured by moving the ring to the first position that the guiding block is stopped by the lock block, and when the ring is moved to the second position, the guiding block is free to move along the first slot and the second slot that the bristle member is drawn out of the handle.

DETAILED DESCRIPTION OF THE INVENTION

Figure 1:
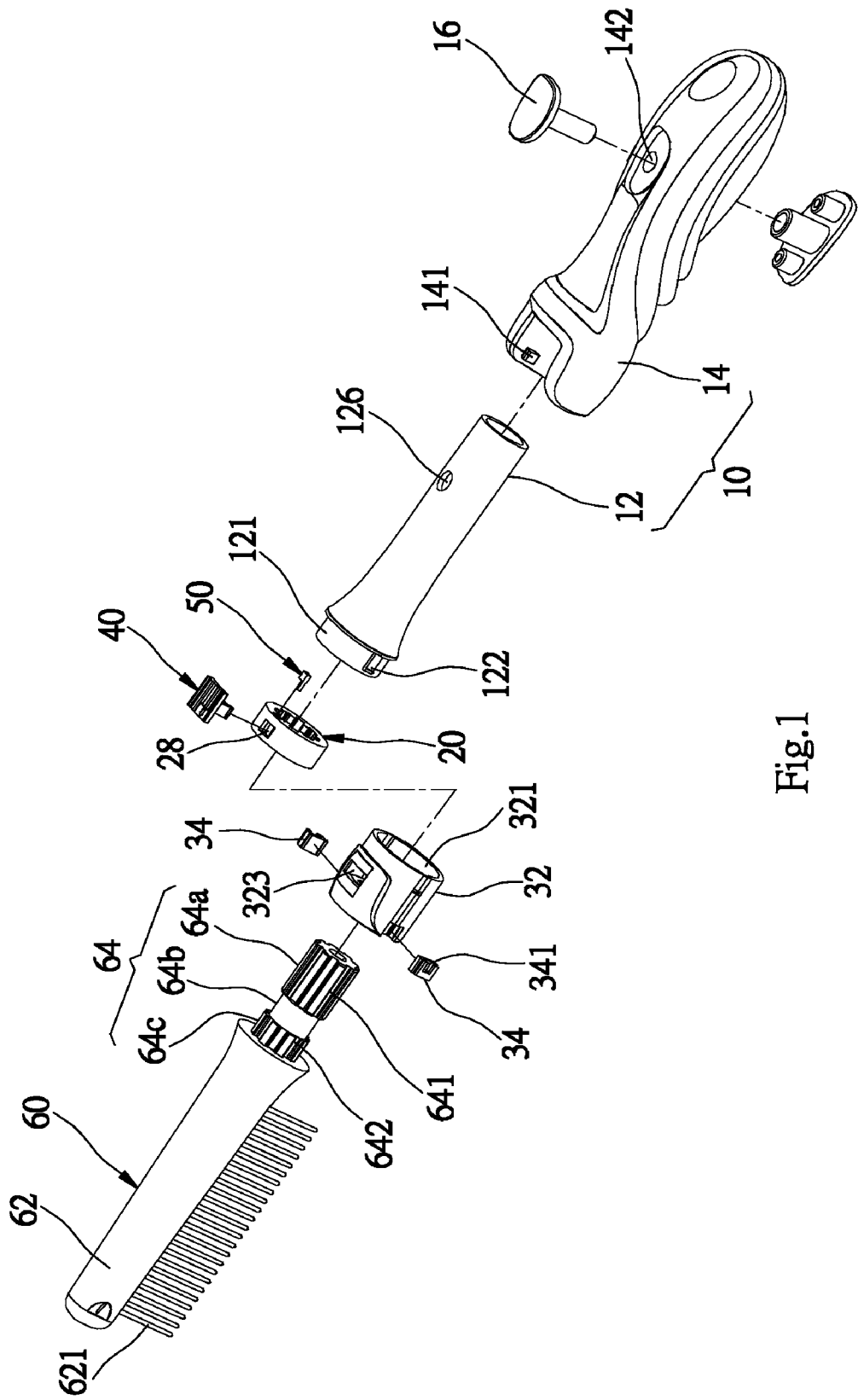
FIG. 1 is an exploded view of a preferred embodiment of the present invention.
Figure 2:
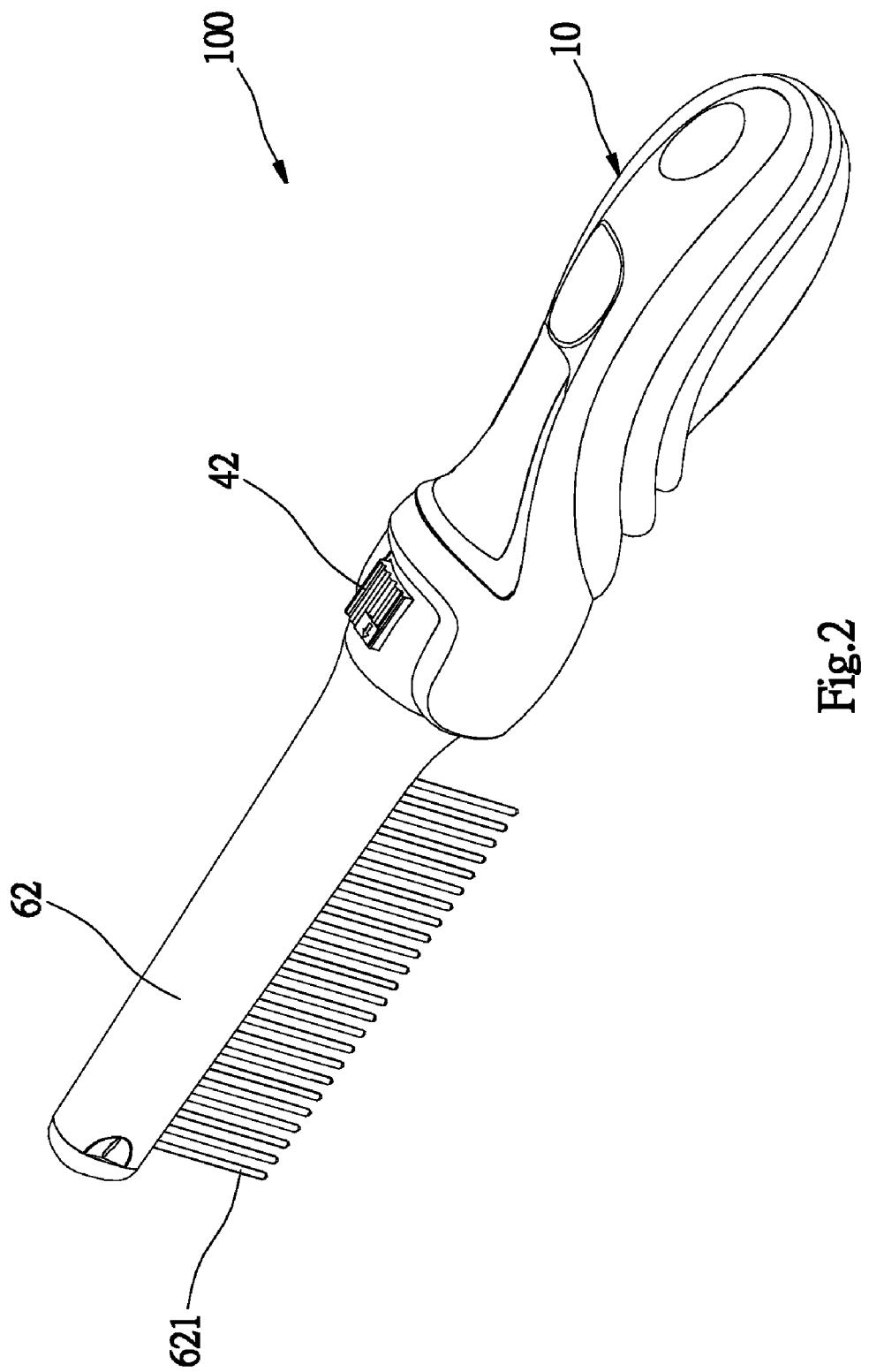
FIG. 2 is a perspective view of the preferred embodiment of the present invention.

As shown in FIG. 1 and FIG. 2, a pet brush 100 of the preferred embodiment of the present invention includes a handle 10, a ring 20, a hub 30, a switch member 40, a plug member 50, and a bristle member 60.

Figure 3:
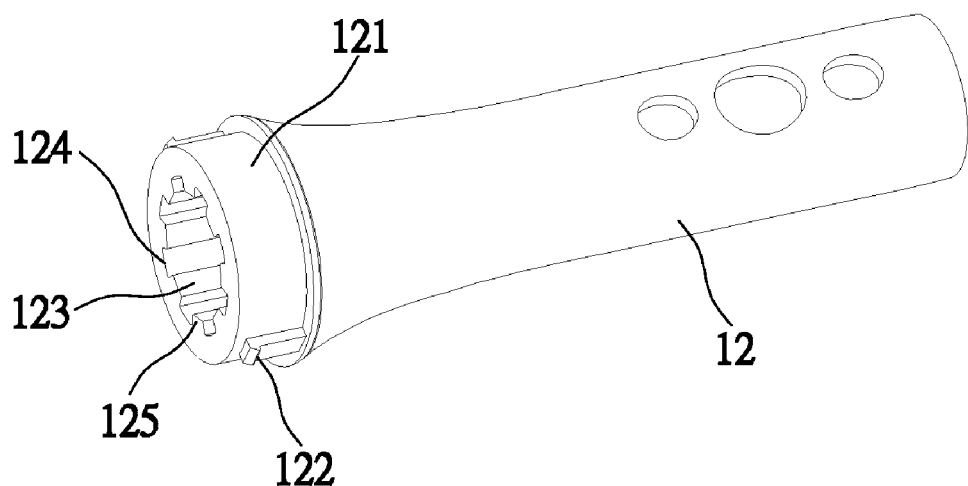
FIG. 3 is a perspective view of the handle tube of the preferred embodiment of the present invention.

The handle 10 has a handle tube 12, and a skid proof member 14. As shown in FIG. 3, the handle tube 12 has a connecting section 121 at a front end, on which two first positioning blocks 122 are provided, a first bore 123, and a plurality of first slots 124 on a sidewall of the first bore 123, and a plurality of ribs 125 between the neighboring first slots 124. The skidproof member 14, which is fitted to the handle tube 12, has two second positioning blocks 141 on an inner side adjacent to a front end thereof. In the present embodiment, the handle tube 12 and the skidproof member 14 are provided with positioning openings 126, 142 respectively for a connecting device 16 inserted into the positioning openings 126, 142 for a connection of the handle tube 12 and the skidproof member 14.

Figure 4:
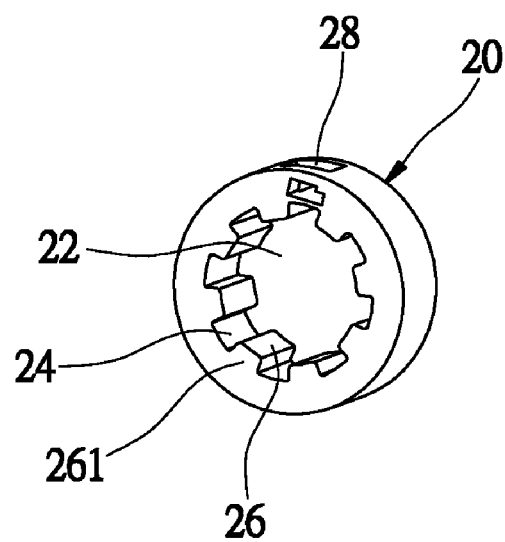
FIG. 4 is a perspective view of the ring of the preferred embodiment of the present invention.

The ring 20 is a round disk with an opening 22 at a center thereof. As shown in FIG. 4, the ring 20 has a plurality of second slots 24 on a sidewall of the opening 22 and lock blocks 26 between the neighboring second slots 24, each of which has a face 261 at an end of the ring 20. The ring 20 further has a lock bore 28 on a circumference thereof.

Figure 5:
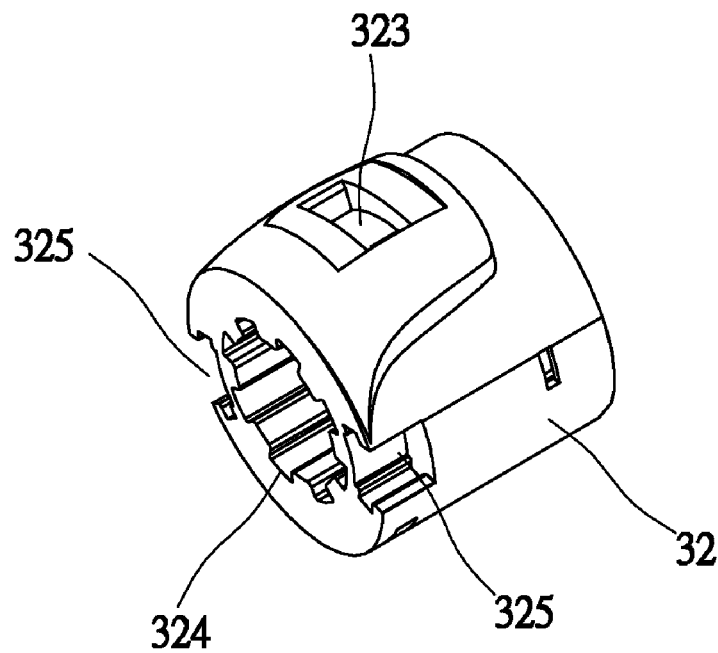
FIG. 5 is a perspective view of the hub of the preferred embodiment of the present invention.
Figure 6:
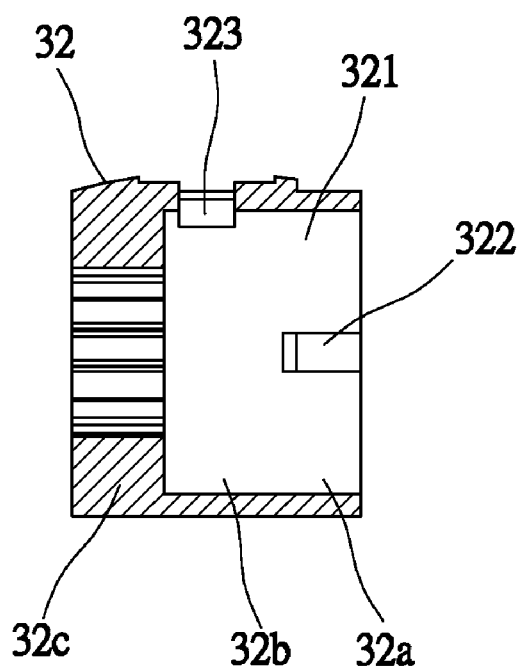
FIG. 6 is a sectional view of FIG. 5.

The hub 30 includes a barrel 32 and two blocks 34. As shown in FIG. 5 and FIG. 6, the barrel 32 has a second bore 321 at a center thereof. The barrel 32 has a front section 32a, a middle section 32b, and a rear section 32c, wherein the front section 32a is fitted to the connecting section 121 of the handle tube 12 with an engagement of two first positioning slots 322 on an inner side of the front section 32a and the first positioning blocks 122 of the handle tube 12 respectively. The ring 20 is fitted to the middle section 32b of the barrel 32 for free rotation. The barrel 32 has an elongated opening 323 in the middle section 32b. The elongated opening 323 has a first end 323a and a second end 323b. The barrel 32 has a plurality of third slots 324 on an inner side and two slots 325 on an outer side for engagement with the blocks 34 respectively. Each of the blocks 34 has a second positioning slot 341 to be engaged with the second positioning block 141 of the skidproof member 14. Thus, the hub 30 is firmly connected to the handle 10 and not rotatable, and the third slots 324 of hub 30 are aligned with the first slots 124 of the handle 10 respectively.

Figure 7:
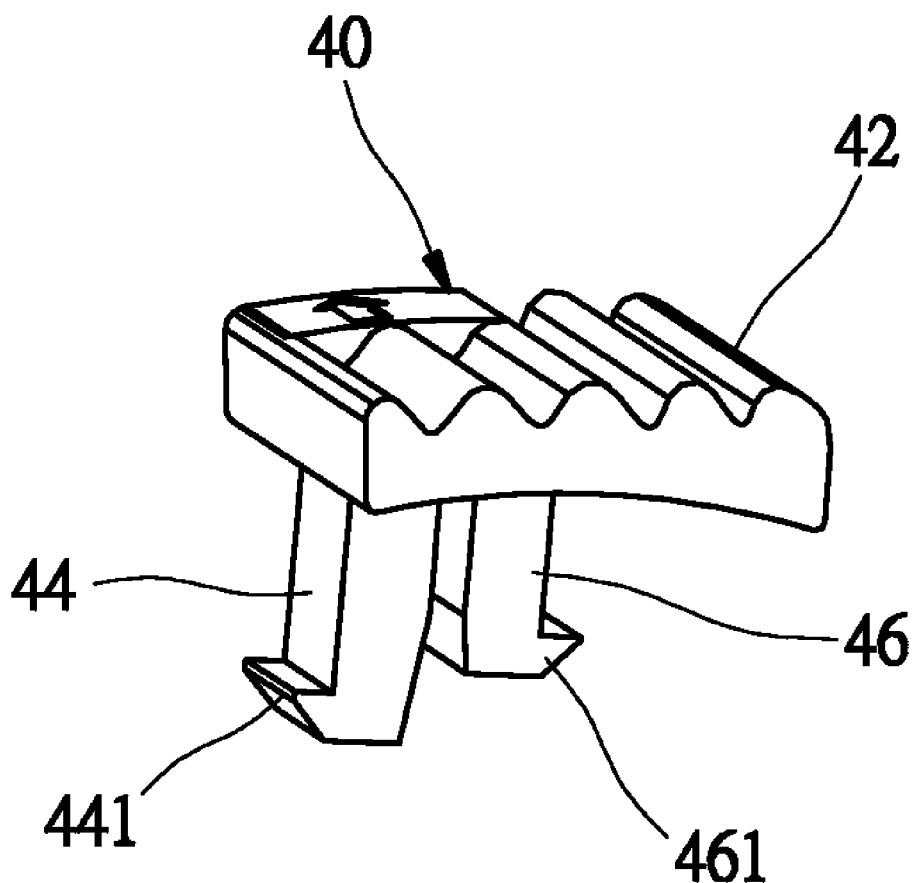
FIG. 7 is a perspective view of the switch member of the preferred embodiment of the present invention.
Figure 8:
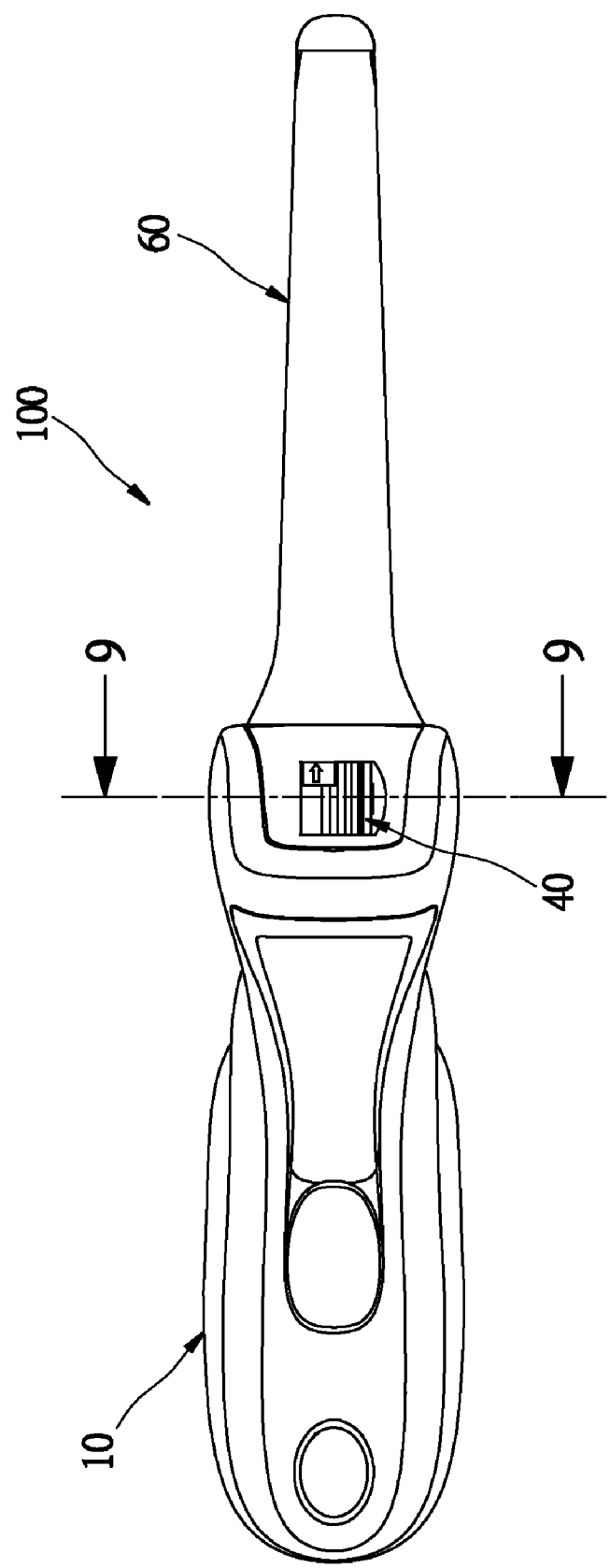
FIG. 8 is a top view of the preferred embodiment of the present invention.
Figure 9:
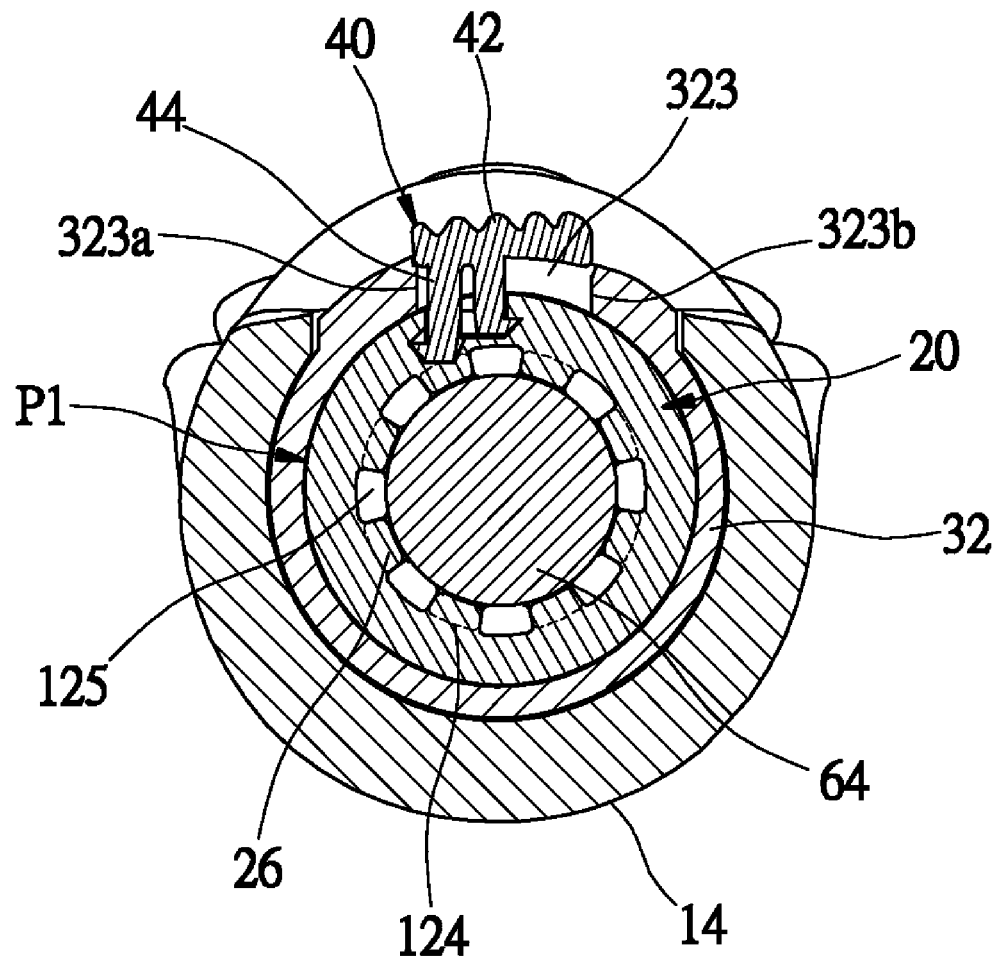
FIG. 9 is a sectional view along the 9-9 line of FIG. 8.
Figure 10:
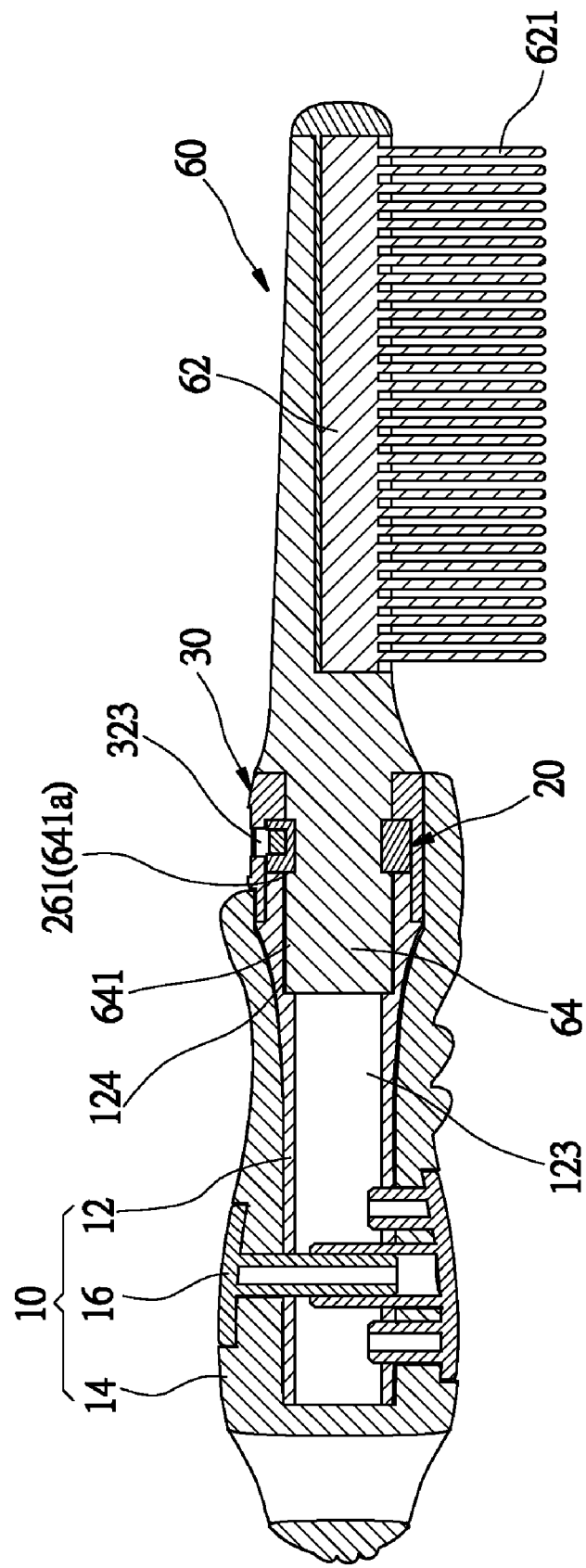
FIG. 10 is a sectional view of the preferred embodiment of the present invention, showing the bristle member being locked.
Figure 11:
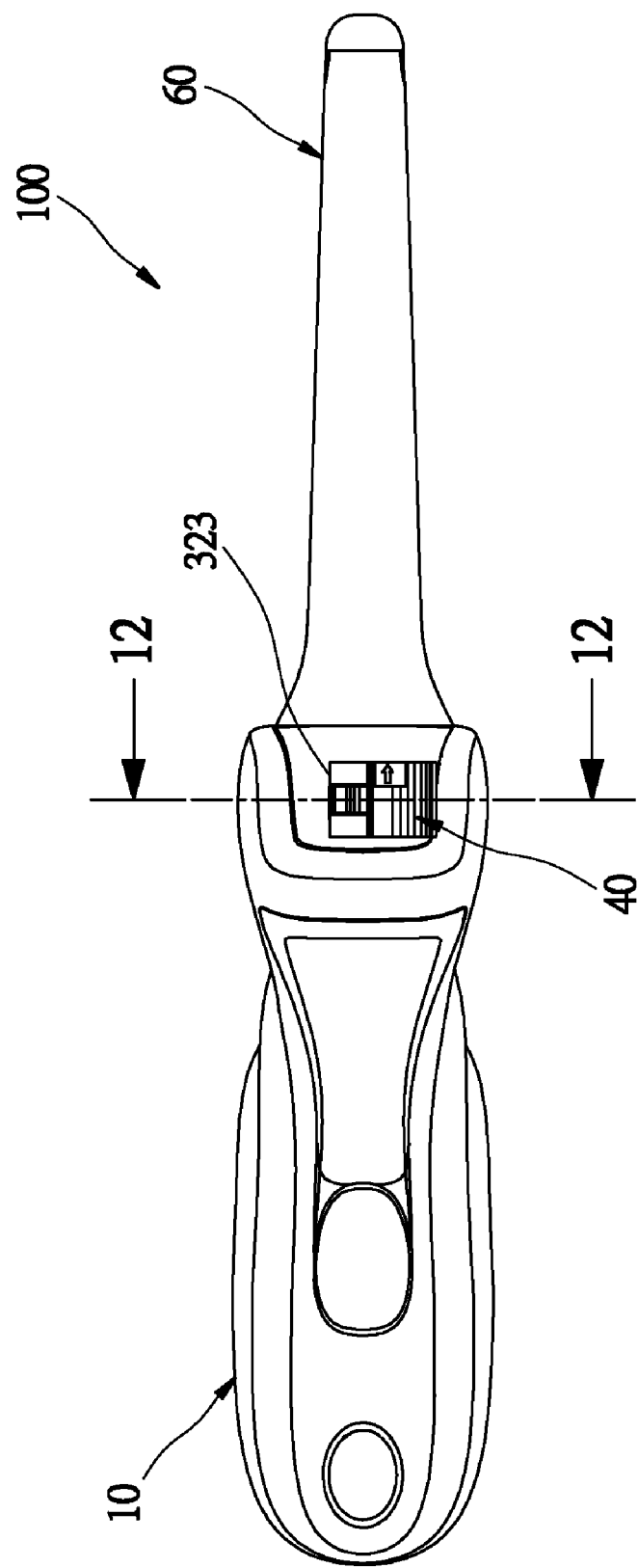
FIG. 11 is a top view of the preferred embodiment of the present invention, showing the switch member being switched.
Figure 12:
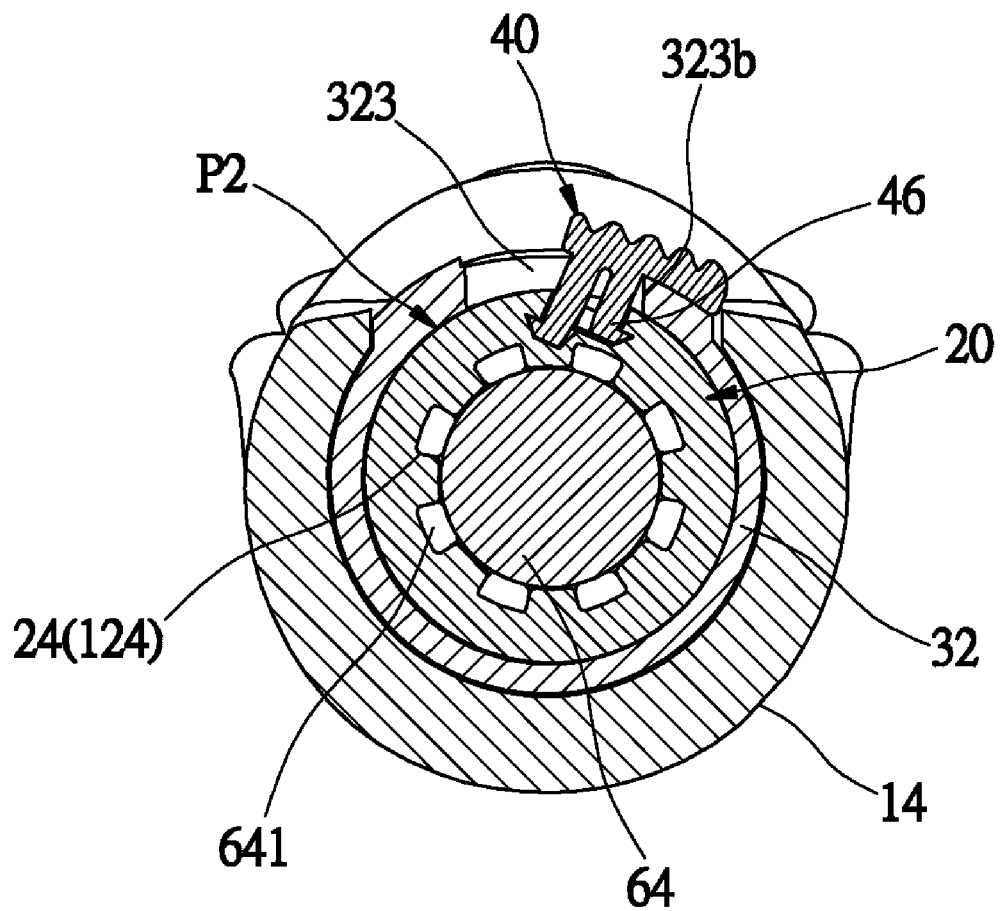
FIG. 12 is a sectional view along the 12-12 line of FIG. 11.
Figure 13:
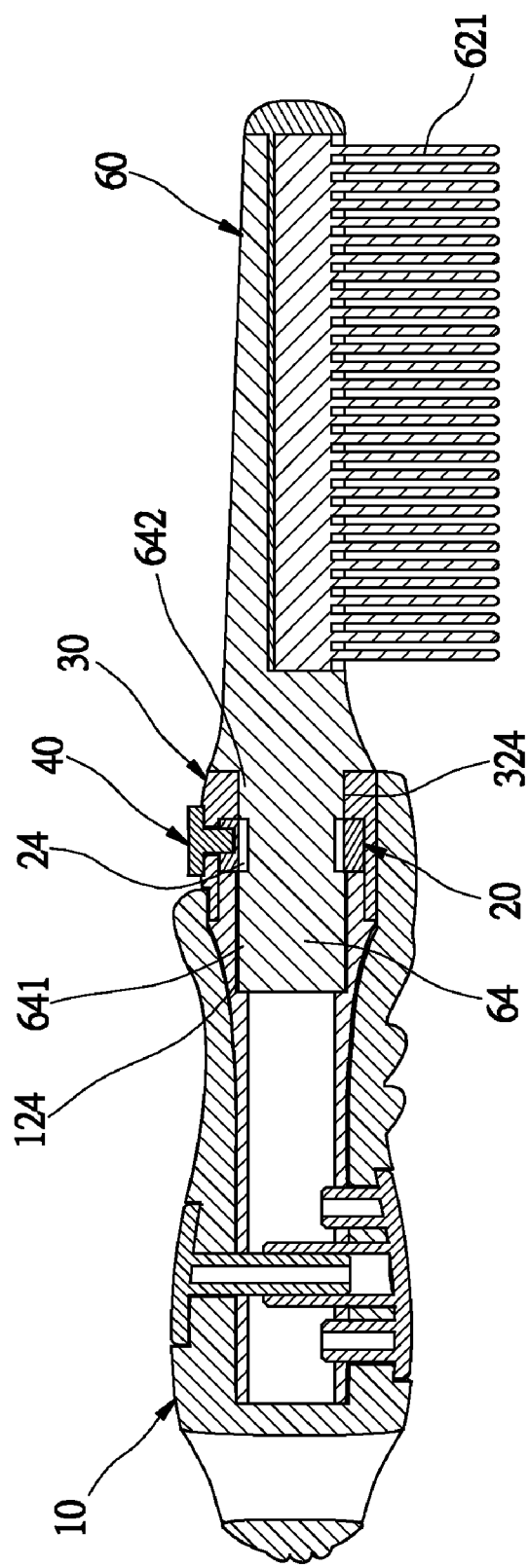
FIG. 13 is a sectional view of the preferred embodiment of the present invention, showing the bristle member being unlocked.

As shown in FIG. 7, the switch member 40 has a switch 42, on a bottom of which a left foot 44 and a right foot 46 are provided. The feet 44 and 46 pass through the opening 323 of the barrel 32 and the lock bore 28 of the ring 20 respectively. Each foot 44 and 46 has a hook 441, 461 on a distal end to be engaged with an edge of the lock bore 28. The plug member 50 is squeezed into a space between the feet 44 and 46 to ensure the feet 44 and 46 from escaping from the lock bore 28. The switch 42 of the switch member 40 is operated by a user shifting to right or left. As shown in FIGS. 8, 9, and 10, when the switch member 40 is moved to left with the left foot 44 touching the first end 323a of the opening 323, the ring 20 is located at a first position P1, and the lock blocks 26 are aligned with the first slots 124 of the handle tube 12 of the handle 10 respectively (seeing the dot lines of FIG. 9), that is, the lock blocks 26 and the ribs 125 are not interfered with each other. As shown in FIGS. 11, 12, and 13, when the switch member 40 is moved to right with the right foot 46 touching the second end 323b of the opening 323, the ring 20 is located at a second position P2, and the second slots 24 are aligned with the first slots 124 of the handle tube 12 of the handle 10 respectively.

The bristle member 60 has a bristle portion 62 and a shaft 64. The bristle portion 62 has a plurality of bristles 621. The shaft 64 has a front section 64a, a middle section 64b, and a rear section 64c. In the front section 64a, a plurality of guiding blocks 641 are projected to form a fitting section. A diameter of the middle section 64b is smaller than the rest sections. The rear section 64c is provided with protrusions 642. As shown in FIG. 10, when the shaft 64 is inserted into the first bore 123 of the handle tube 12 of the handle 10, the guiding blocks 641 would slide into the first slots 124 respectively, the ring 20 would be fitted to the middle section 64b, and the protrusions 642 would be engaged with the third slots 324 of the hub 30 respectively that the bristle member is not rotatable. As shown in FIG. 10, the ring 20 is at the first position P1 that the guiding blocks 641 of the shaft 64 have inner sides 641a touching the faces 261 of the lock blocks 26 of the ring 20 to ensure that the bristle member 60 is unable to be drawn out in opposite.

To replace a new bristle member 60 with different bristle portions, one only has to move the switch member 40 to have the ring 20 shifted to the second position P1 that the second slots 24 of the ring are aligned with the first slots 124 of the handle tube 12 respectively, as shown in FIG. 12. Under such condition, the guiding blocks 641 of the shaft 64 of the bristle member 60 may be moved along the second slots 24 and the third slots 324 respectively to draw the bristle member 60 out. Next, one may align guiding blocks 641 of a front section 64a of the new bristle member 60 with the third slots 324 to insert the new bristle member 60 into the handle 10, and then switch the switch member 50 to move the ring 20 to the first position P1 to secure the bristle member 60 and complete the replacement procedure.

In conclusion, the pet brush 100 of the present invention may be replaced with a preferred bristle member 60 for different animals. It provides the ring 20 to be operated to prevent the bristle member 60 from separation that the bristle member 60 will not be drawn out when one brushes the pet's hair.

The description above is a few preferred embodiments of the present invention. The present invention may have no hub that the first positioning slots, the elongated opening, the first end, the second end, and the third slots are provided on the handle. These equivalences of the present invention are still in the scope of claim construction of the present invention.

What is claimed is:

1. A pet brush, comprising:
    a handle having a first bore and at least a first slot on a sidewall of the first bore;
    a hub, which is fixed to the handle and is unable to rotate, having a second bore communicated with the first bore of the handle;
    a ring, which has at least a second slot on an inner side and at least a lock block with a face, received in the second bore of the hub to be moved between a first position, in which the lock block is aligned with the first slot of the handle, and a second position, in which the second slot is aligned with the first slot of the handle; and
    a bristle member having a shaft with at least a guiding block, wherein when the shaft of the bristle member is inserted into the first bore of the handle and the guiding block is engaged with the first slot, the bristle member is secured by moving the ring to the first position that the guiding block is stopped by the lock block, and when the ring is moved to the second position, the guiding block is free to move along the first slot and the second slot that the bristle member is drawn out of the handle.

2. The pet brush as defined in claim 1, further comprising a switch member including at least a foot passing through an opening of the hub to be connected to the ring, wherein the opening of the hub has a first end and a second end that the foot touches the first end when the ring is moved to the first position, and the foot touches the second end when the ring is moved to the second position.

3. The pet brush as defined in claim 2, wherein the switch member has two of the feet, each of which has a hook on a distal end, and the feet pass through a lock bore of the ring and are engaged with the ring by the hooks.

4. The pet brush as defined in claim 3, further comprising a plug block provided in a space between the feet.

5. The pet brush as defined in claim 1, wherein the bristle member includes a bristle portion and the shaft, and the shaft has a fitting section, in which the guiding block is provided, and a section with a diameter smaller than the fitting section to be inserted into the ring when the shaft is inserted into the first bore of the handle.

6. The pet brush as defined in claim 5, wherein the hub has at least a third slot on a sidewall of the second bore to be aligned with the first slot, and the shaft is provided with a protrusion between the fitting section and the section with smaller diameter to be engaged with the third slot when the shaft is inserted into the first bore of the handle.

7. The pet brush as defined in claim 1, wherein the handle includes a handle tube, on which first bore and the first slot are provided, and a skidproof member fitted to the handle tube, and the handle tube has a connecting section at a front end thereof, on which at least a first positioning block is provided, and the skidproof member has at least a second positioning block in an inner side thereof, and the hub has at least a portion fitted to the connecting section of the handle tube that the hub has at least a first positioning slot on an inner side to be engaged with the first positioning block of the handle tube and at least a second positioning slot on an outer side to be engaged with the second positioning block.

8. The pet brush as defined in claim 7, wherein the hub has a barrel, on which at least a slot is provided, and at least a block, on which the second positioning slot is provided, received in the slot on the barrel.

* * * * *